June 26, 1962     W. HOLZER     3,041,480
DRIVING MEANS OF AN IMPULSE DEVICE AND STEPPING
MECHANISM FOR PROGRAM CONTACTS
Filed March 22, 1960
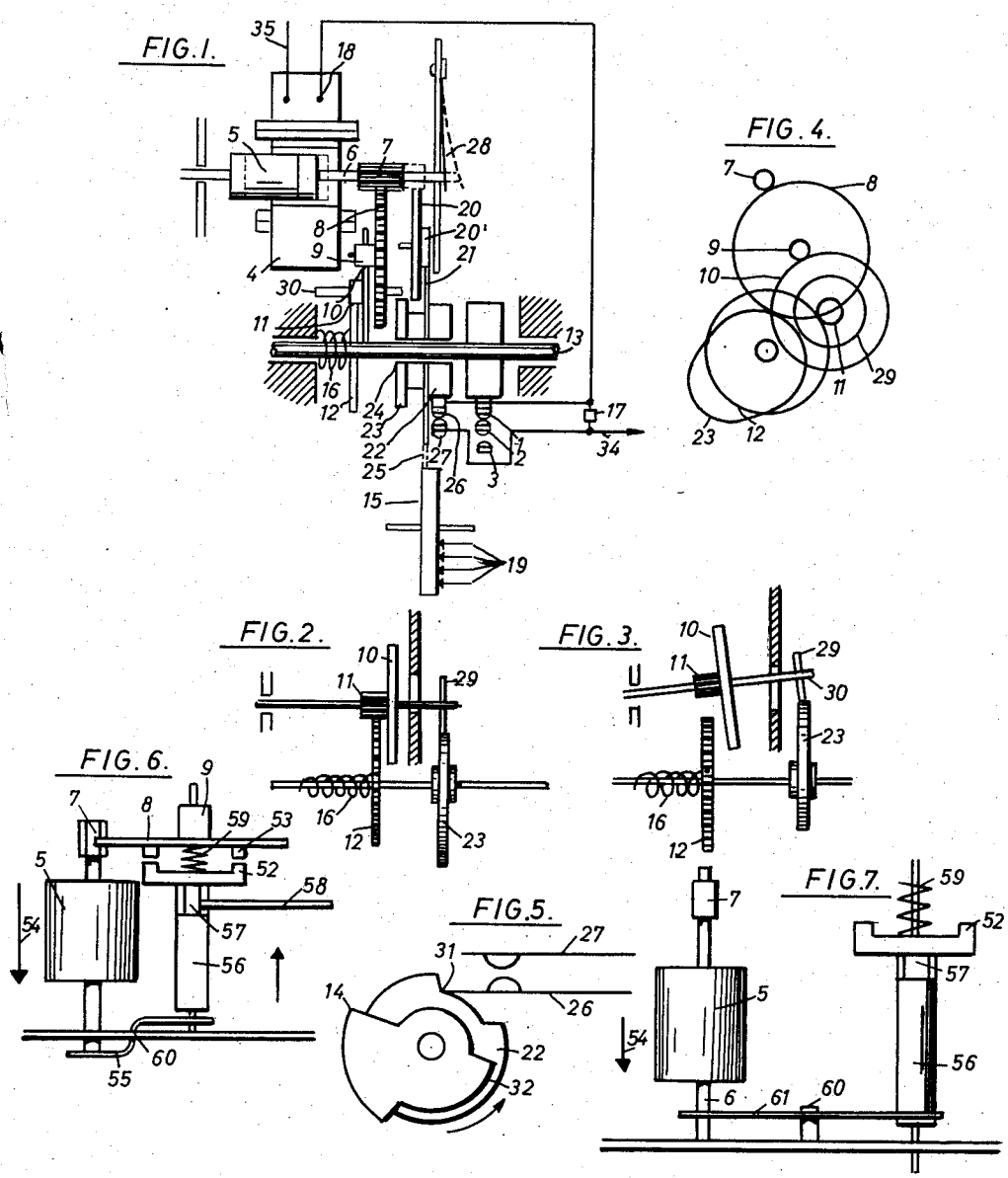
INVENTOR:
WALTER HOLZER
By Toulmin & Toulmin
Attorneys

United States Patent Office 3,041,480
Patented June 26, 1962

3,041,480
DRIVING MEANS OF AN IMPULSE DEVICE AND STEPPING MECHANISM FOR PROGRAM CONTACTS
Walter Holzer, Meersburg (Bodensee), Germany
Filed Mar. 22, 1960, Ser. No. 16,789
Claims priority, application Germany June 15, 1959
14 Claims. (Cl. 307—141)

The invention relates to a driving apparatus for a program control device for washing machines having a motor driven pulse producing device or timer and a motor driven step switching program contact control device.

In the usual arrangement the pulse device furnishing timed pulses for the stepping of a program switch, and the driving means for the program contacts each have a separate motor. The separate motors were a necessity since the pulse device must function at precise intervals, thus requiring a motor with highly constant speed, while the stepping of the program contacts in intermittent service requires an asynchronous motor, i.e., a motor with a high torque. This motor, as a rule, does not have the constant speed necessary for synchronous operation.

Further disadvantages of using two motors include the increased probability of breakdown, the need for more space, and the increased production costs. The object of this invention is to avoid these disadvantages and to employ a single motor for the function usually carried out by two. Nevertheless, the same advantages must be retained in respect to versatility and further requirements for the precise functioning of the impulse device and the stepping device for the program contacts.

According to one aspect of the invention in a preferred embodiment thereof it is suggested to employ a single motor for driving in steps a rotatable program control or switching device as well as a timer or pulse control; the motor has an axially displaceable rotor being geared to the step control only in one position thereof.

Another feature of the invention is a cam disc rotating together with the program control and temporarily interrupting a link or driving connection or coupling within the gear transmission driving the pulse control so that the latter can return to zero or initial position. Another feature of the invention is a spring biased gear or clutch governing the link between rotor and program control; the spring bias is overcome by an electric control shifting the rotor into driving engagement with the program control, while the electric control is disabled by the program control itself after one step, and then the spring shifts the rotor back whereby the latter is disengaged from the program control.

In accordance with this kind of design, a motor with a specially built coupling is used to ensure that both the impulse device and the stepping device for the program contacts return independent of one another to their initial positions after the conclusion of a pulse or a step.

A motor which is specially suited for the simultaneous drive of the impulse device and the stepping of the program contacts and has a shiftable armature in slidable direction, so that the sliding armature through poles functions as a synchronous motor in one axial position and as an asynchronous motor in a second position axially displaced from the first mentioned position.

This arrangement can be considered the ideal solution, since on the one hand it ensures absolute precision of the pulse transmission, and on the other hand it provides the greatest amount of torque for the stepping of the program contacts. In accordance with this construction, the drive can be shifted from impulse device to program contacts in merely using control currents. Not even a special control solenoid, nor any other kind of intermediary is then necessary. There may be provided manually operated contacts, operating together with the program contacts, since when the predetermined position is reached, it is by-passed because the automatic cut-out contacts of the drive motor are bridged.

This arrangement permits the arbitrary exclusion or by-passing of whole program sections in order to change the wash-program. We are dealing here with rapid pre-selection.

While the specification concludes with claims particularly pointing out and distinctly claiming the subject matter which is regarded as the invention, it is believed that the invention, the objects of the invention, and further objects and advantages thereof, will be better understood from the following description taken in connection with the accompanying drawing in which:

FIG. 1 shows schematically the application of one motor to drive a pulse device as well as a stepping device, using a motor which functions alternately as a synchronous or asynchronous rotor.

FIG. 2 shows one position of a coupling shown in FIG. 1 in action.

FIG. 3 shows the disengaged position of the coupling in FIG. 1 in action.

FIG. 4 shows a side view of the wheels in FIG. 2.

FIG. 5 shows one possible arrangement of a contact system of a pulse device including an automatic cut-out or self-interruption mechanism.

FIG. 6 shows a sliding or axially displaceable rotor operating upon a specific mechanical coupling, and FIG. 7 is a modification of the device shown in FIG. 6.

FIG. 1 shows one possible construction in an arrangement in which a single motor operates a pulse device as well as the stepping of program contacts over a coupling. In FIG. 1 a pulse contact system, consisting of contacts 1, 2 and 3, is driven by motor 4 having an axially displaceable rotor 5 with shaft 6. Contacts 1, 2 and 3 are operated upon by the following intermediate elements: Armature rotor 5 has a pinion 7 on its shaft 6, which together with its gear wheel 8 and a pinion 9 drives an intermediate wheel 10 having pinion 10 which in turn drives a gear wheel 12. Gear wheel 12 is secured to shaft 13 carrying a cam disc in which directly operates contacts 1, 2 and 3. Contacts 12 and 3 are closed in sequence when cam disc 14 is turned. The closing of these contacts in sequence may also be used to start a stepping of switching disc 15, which, in turn, operates program contacts 19, as well as the other contacts not shown. This will be described below.

In accordance with the principles of the invention, the cam disc 14 is driven via a coupling formed by the intermediate wheel 10 and its pinion 11. This pinion 11 can be disengaged from gear wheel 12. When pinion 11 is disengaged, spring 16 recoils by rotation gear wheel 12, shaft 13 and cam disc 14 back into their initial or zero position.

The stepping of switching disc 15 is produced by motor 4 by means of other intermediate elements, but disc 15 is not always coupled drivingly to member 4. Power transmission is achieved in the following manner and by means of the following elements. There is provided an electrical resistor 17 connected in series in the lead-in wire to motor winding 18.

Resistor 17 can be over-bridged by contacts 26—27. Armature or rotor 5 moves into the position indicated by the dotted lines under the influence of the increased magnetization. Increased magnetization occurs when resistor 17 is short-circuited. When rotor 5 is in the "dotted" position pinion 7 is engaged with gear wheel 20 having a pinion 20'. Pinion 20' meshes with a drive wheel 21. Drive wheel 21 is integral with or secured to cam discs 22 and 23. Cam disc 22 is depicted in FIG. 5. Disc 23 is eccentric as shown in FIG. 4. Eccentric disc 23 and disc 27 is keyed onto hollow shaft 24 receiving shaft 13. Drive wheel 21 drives switching disc 15 for program contacts 19, eventually over intermediate elements 25.

Cam disc 22 operates contacts 26 and 27 bridging resistor 17 during any one step, until cam disc 22 has returned to its initial position and opened contacts 26 and 27 by means of recess 31. In that way resistor 17 is placed again in series circuit connection of motor 4. In this instance armature or rotor 5 is forced back into its initial position by spring 28.

During one revolution of cam disc 22, corresponding to one step of switching disc 15, the eccentric disc 23 temporarily disengages intermediate wheel 10 and pinion 11 from gear wheel 12. This operation will be comprehended in connection with FIGS. 2 and 3. In FIG. 2 pinion 11 is engaged with gear wheel 12 and pulse contacts 1, 2 and 3 are then driven by cam disc 14.

In FIG. 3 eccentric disc 23 is in a position occurring during the stepping (rotation of elements 22, 23 and 24) that an intermediate wheel 29 (omitted in FIG. 1) together with shaft 30 carrying intermediate wheel 10 and pinion gear 11, are raised. In this position pinion 11 and gear wheel 12 are disengaged and spring 16 recoils gear wheel 12, shaft 13 and cam disc 14 by rotation, into their initial position, which is the initial position of the timer or pulse device.

FIG. 4 shows the gearing in FIGS. 2 and 3 from a side view. It is particularly important that the axial shift needed to engage pinion 7 and gear wheel 20 is used to change the running characteristics of motor 4. When rotor 5 is in the position shown in the drawing, it functions, in the presence of poles, as a synchronous motor which, with a small load, operates with the greatest precision. In the position indicated by the dotted lines, corresponding to an increased magnetization current, the motor functions as an asynchronous motor and is capable of producing a relatively high amount of torque. This is necessary in order to operate switching disc 15 and a number of program contacts 19.

This arrangement described thus far operates in the following way. First motor 4 runs as a synchronous motor and drives cam disc 14 out of its initial position so that contacts 1, 2 and 3 be closed after predetermined times. This is the timer action of the pulse device. The contacts may also effect an increase of the magnetization current over a pre-selector not appearing in the drawings, over-bridging resistor 17. The increased magnetization current pulls rotor 5 into the position indicated by the dotted lines. Now pinion 7 engages wheel 20 and switching disc 15 is rotated with a high amount of torque; cam discs 22 and 23 follow this rotation. Cam disc 22 operates contacts 26 and 27 as stated. These contacts 26 and 27 maintain the increased magnetization current by continuing the bridging of resistor 17 until cam disc 22 has revolved completely. Thus, resistor 17 remains out of circuit even if contacts 1—3 are opened by the recoiling of cam disc 14 described above. Cam disc 22 insures that a complete revolution of elements 22 and 23 is carried out before contacts 26 and 27 are opened so that a complete step of switching disc 15 takes place with motor 4 running as a synchronous motor. When recess 31 opens contacts 26 and 27, rotor 5 returns to its initial position due to the decreased magnetization current. Pinion 7 then again is disengaged from gear wheel 20, and the movement of the switching disc 15 and of cam discs 22 and 23 ends.

FIG. 5 furthermore shows a simplified design of the arrangement depicted in FIG. 1, whereby both cam disc 14 and cam disc 22 operate the same contacts 26 and 27. The arrangement operates in the following manner: After a given period of time, shoulder 32 of cam disc 14 reaches contact 26 and bends it so as to connect with contact 27. In that way only contacts 26 and 27 serve to shunt resistor 17 so that the magnetization current of motor 4 is increased. Thereafter cam disc 22 commences to run thereby holding contacts 26 and 27 in a closed position for a complete revolution of disc 22.

During the revolution of cam disc 22, corresponding to a step of switching disc 15, the coupling, consisting of intermediate wheel and pinion 11 is disengaged and cam disc 14 is recoiled back into its starting or zero position as outlined above. Independent of that, cam disc 22 affixed to hollow shaft 24 completes its revolution until contacts 26 and 27 pass through recess 31 and open with the effect outlined above. One reservation must be made for this arrangement, namely that only one impulse time can be controlled.

FIG. 6 shows a particularly reliable construction of the coupling between rotor 5, the gearing for the pulse device and the stepping device. Parts having the same function are designated alike. The advantage of this arrangement lies in the fact that pinion 7 always remains engaged with gear wheel 8, even when rotor 5 is shifted. Power transmission for the stepping device is effected over a clutch 52 co-operating with mating claws 53. Pinion 7 continuously drives the pulse device via gear wheel 8 and pinion 9 and the elements shown in FIG. 1 for drivingly connecting pinion 9 to disc 14.

Upon increase of its magnetization current rotor 5 is shifted in the direction of arrow 54 and engages clutch 52 with mating claws 53 over a double-armed lever 55 and a transmission member 56. Now power is transmitted from pinion 7 over gear wheel 8, clutch 52 and a pinion 57 to a gear wheel 58 and thereby over intermediate elements to switching disc 15. This drive also operates cam disc 22 for the automatic cut-out.

Upon decrease of the magnetization current after a completed step, a spring 59 resiliently connecting clutch 52 and claws 53 brings all the parts of the coupling into their initial i.e. disengaged position. Also spring 59 forces rotor 5 back into the position where it runs as synchronous motor. This is also effected by lever 55. The particular advantage of this arrangement not only lies in the fact that pinion 7 always remains engaged with gear wheel 8, but also a certain shock-protection is gained because transmission member 56 has a predetermined mass relationship to the rotor. This arrangement is particularly advantageous when rotor 5 has twice the mass of member 56. In this case, symmetric acceleration relations result, because the acceleration forces of rotor 5 and of transmission part 56 can be balanced in their direction by means of the double-armed lever 56, in suitably selecting the distances of the action points of lever 56 from pivot 60. Here, the static effect of counter-spring 59 is taken into consideration.

FIG. 7 shows another design of the coupling between rotor 5 and the step switching device. In this case, there is provided a leaf spring 61 which grips both rotor shaft 6 and transmission member 56. In this arrangement also, there is a great independence of acceleration forces.

The invention can be used in all cases where one desires to construct a motor and its coupling in such a way that in one position of the coupling, with a very small load, transmission takes place, suitable for a time switch, and in the other position, with huge loads, transmission suitable for the stepping of the contacts.

The invention can also be used in all cases where two driving means are available for a control, where greatest degree of precision is demanded from one driving mechanism, and a high amount of torque required of the other.

We claim:

1. Driving apparatus for a program and timed pulse control device in a washing machine, comprising: an electric motor having an axially displaceable rotor, capable of assuming a first and a second axial position; a rotatable pulse device for operating upon stationary contacts; a rotating step switching device; a first gearing means coupling said rotor to said pulse device for rotation thereof; a second gearing means coupling said rotor to said step switching device only when said rotor is in said second position; and electromechanical control means for shifting said rotor from said first to said second position and vice versa.

2. Device according to claim 1, where the rotor through poles, functions as a synchronous motor when in said first position, and as an asynchronous motor when in said second position.

3. Device as set forth in claim 1 said electromechanical control means including a contact-resistor arrangement governing the current supply to said motor.

4. Device as set forth in claim 1 said electromechanical control means including a switching contact-resistor arrangement governing the magnitude of the current supply to said motor for moving said rotor from said first to said second position, and spring means for axially returning said rotor to said first position.

5. Driving apparatus for a program and timed pulse control device in a washing machine, comprising: an electric motor having an axially displaceable rotor, capable of assuming a first and a second axial position; a rotatable pulse device for operating upon stationary contacts; a first gearing means for making a driving connection between said rotor and said pulse device for rotation thereof and including coupling means for disengaging the connection between rotor and pulse device; means for recoiling said pulse device to its starting position when said connection is disengaged; a rotating step switching device; including means for acting upon said coupling for disengaging said connection; a second gearing means coupling said rotor to said step switching device only when said rotor is in said second position; and electromechanical control means for shifting said rotor from said first to said second position and vice versa.

6. Driving apparatus for a program and timed pulse control device in a washing machine, comprising: an electric motor having an axially displaceable rotor, capable of assuming a first and a second axial position; a rotatable pulse device including a cam disc; a control circuit for said motor including switching contacts acted upon by said cam disc for shifting said motor into said second position; a first gear drivingly connecting said rotor and said pulse device for common rotation and including two disengageably meshing gear wheels which, when disengaged interrupt the connection between rotor and pulse device; a rotating step switching device including a first rotatable cam disc for temporarily disengaging said gear wheels; a second gearing means coupling said rotor to said step switching device only when said rotor is in said second position; spring means recoiling said pulse device when said gear wheels are disengaged; and a second cam disc also rotating with said step switching device and acting in said control circuit for causing return of said rotor to said first position after completion of one step of said step switching device.

7. Driving apparatus for a program and timed pulse control device in a washing machine, comprising: an electric motor having an axially displaceable rotor, capable of assuming a first and a second axial position; a rotatable pulse device for operating upon stationary contacts; a rotating step switching device; a first gearing means coupling said rotor to said pulse device for rotation thereof; a second gearing means coupling said rotor to said step switching device only when said rotor is in said second position; a control circuit including a resistor and contact means for overbridging said resistor, said resistor being in circuit with said motor and governing its current supply, said contact means being open to keep said rotor in its said first position and closed to keep said rotor in its said second position; first cam means rotating with said pulse device for closing said contact means; and second cam means connected to and rotating with said step switching device for opening said contact means thus interrupting any overbridging of said resistor when said step switching device has completed a step.

8. Driving apparatus for a program and timed pulse control device in a washing machine, comprising: an electric motor having an axially displaceable rotor, capable of assuming a first and a second axial position; a rotatable pulse device for operating upon stationary contacts; a rotating step switching device; a first gearing means coupling said rotor to said pulse device for rotation thereof; a second gearing means coupling said rotor to said step switching device only when said rotor is in said second position; means actuated by said step switching device for recoiling said pulse device to its starting position when said second gearing means is drivingly coupled to said step switching device; and electromechanical control means for shifting said rotor from said first to said second position and vice versa.

9. Driving apparatus for a program and timed pulse control device in a washing machine, comprising: an electric motor having an axially displaceable rotor, capable of assuming a first and a second axial position; a control circuit for said motor; a rotatable pulse device for operating upon stationary contacts; further stationary contact means actuated by said pulse device including contacts inserted in said control circuit and effective for shifting said rotor into said second position; a first gearing means coupling said rotor to said pulse device for rotation thereof; a rotating step switching device including mechanical control means effective in said control circuit for effecting return of said rotor to said first position after one step; and a second gearing means coupling said rotor to said step switching device only when said rotor is in said second position.

10. Driving apparatus for a program and timed pulse control device in a washing machine, comprising; an electric motor having an axially displaceable rotor, capable of assuming a first and a second axial position; a rotatable pulse device for operating upon stationary contacts; a first gearing means coupling said rotor to said pulse device for rotation thereof; electric control means actuated by said pulse device for shifting said rotor from said first to said second position and keeping it there; a rotating step switching device including means for disabling said control means; mechanical control means including a spring for returning said rotor to said first position when said control means are disabled; a second gearing means coupling said rotor to said step switching device only when said rotor is in said second position.

11. Device as set forth in claim 10, said mechanical control means further including a lever biased by said spring for effecting the coupling of said second gearing means.

12. Driving apparatus for a program and timed pulse control device in a washing machine, comprising: an electric motor having an axially displaceable rotor, capable of assuming a first and a second axial position; a rotatable pulse device for operating upon stationary contacts; a first gearing means coupling said rotor to said pulse device for rotation thereof; electric control means actuated by said pulse device for shifting said rotor from said first to said second position and keeping it there; a rotating step switching device including means for disabling said control means; mechanical control means including a spring for returning said rotor to said first position when said control means are disabled; a lever engaged by said rotor and biased by said spring; a clutch and claw arrangement geared to said step switching device and said rotor; and means for linking said lever to any of said clutch and claw for causing engagement thereof when said rotor is in said second position.

13. Device as set forth in claim 12, said lever being a pivoted double arm lever, one arm engaging said rotor, the other arm said clutch and claw arrangement, the distribution of mass moved by and in conjunction with any pivot motion of said lever being selected that the mass at the rotor-side is about twice the mass at the other side.

14. Device as set forth in claim 12, said lever being a double-arm-leaf-spring with one side thereof engaging said rotor the other side thereof engaging said clutch.

References Cited in the file of this patent

UNITED STATES PATENTS 2,599,234  Clark _____ June 3, 1952